United States Patent [19]
Forster et al.

[11] 3,756,125
[45] Sept. 4, 1973

[54] STEERING MECHANISM FOR VEHICLES

[75] Inventors: Hans-Joachim M. Forster; Klaus Katz, both of Stuttgart; Otto Lattner, Pfreimd, all of Germany

[73] Assignee: Daimler-Benz Aktiengesellschaft, Stuttgart-Unterturkheim, Germany

[22] Filed: Dec. 3, 1971

[21] Appl. No.: 204,604

[30] Foreign Application Priority Data
Dec. 5, 1970 Germany.................. P 20 60 017.3

[52] U.S. Cl..................................... 91/380, 74/499
[51] Int. Cl............................................. F15b 9/07
[58] Field of Search..................... 74/498, 499, 500, 74/497; 92/136; 91/380, 466

[56] References Cited
UNITED STATES PATENTS
| | | | |
|---|---|---|---|
| 1,343,846 | 6/1920 | Rapson | 74/499 |
| 2,144,489 | 1/1939 | Gieskieng | 74/500 |
| 3,476,203 | 11/1969 | Forster et al. | 91/380 X |

*Primary Examiner*—Milton Kaufman
*Attorney*—Craig, Antonelli and Hill

[57] ABSTRACT

A steering system for vehicles with a steering worm which is spirally movably connected with the steering nut and is axially fixed in the steering gear housing; axial compression springs, preferably cup springs are thereby interconnected between the steering worm and the steering gear housing.

27 Claims, 1 Drawing Figure

PATENTED SEP 4 1973 3,756,125
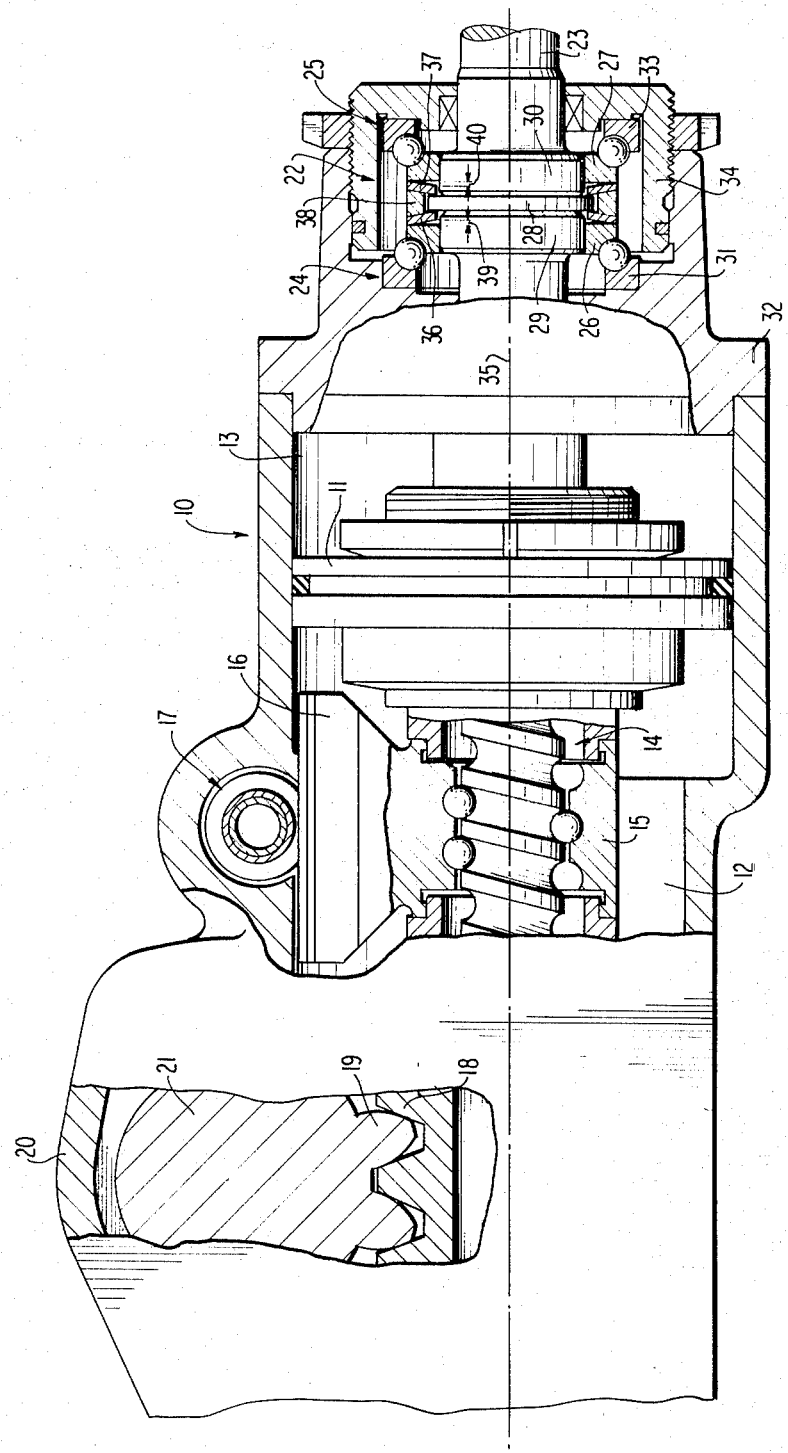

STEERING MECHANISM FOR VEHICLES

The present invention relates to a steering mechanism for vehicles with a steering worm that is helically movably connected with the steering nut and is axially fixed in the steering gear housing.

The aim underlying the present invention essentially consists in providing a steering system of the aforementioned type in which the shocks and impacts introduced from the road surface into the steering gear are damped and therefore cannot become effective at the steering hand wheel.

The underlying problems are solved according to the present invention in that axial compression springs are interconnected between steering worm and steering gear housing. According to the present invention, a certain axial play is provided between the steering worm and the steering gear housing so that the steering worm is able to displace under the impact effect and the shocks can be absorbed by the compression springs.

It is known in the prior art to rotatably support and axially fix a steering nut within the working piston of a servo-steering system. The steering nut thereby serves as transmitter element for a control slide valve controlling the working pressure in the working spaces on both sides of the working piston. In order to attain in the application of the present invention to such a servo-steering system that the steering worm is able to displace itself during the turning of the steering hand wheel only when a pressure control is already initiated by the steering nut, it is proposed according to a further feature of the present invention that the compression springs are under prestress in the mutual neutrally position between steering worm and steering gear housing and that the steering gear housing is provided with means for absorbing the prestress for the compression springs respectively relieved during the relative displacement of the steering worm with respect to the steering gear housing.

A structurally simple and compact construction of the steering mechanism according to the present invention is characterized in that the steering gear housing is provided with conical support surfaces for the cup springs supporting the steering worm.

The manufacture and assembly of the steering mechanism according to the present invention with conical support surfaces are further simplified according to a further development of the present invention in that a cone ring with conical cross section is inserted between two mutually oppositely disposed cup springs.

Accordingly, it is an object of the present invention to provide a steering system for vehicles which avoids by simple means the aforementioned shortcomings and drawbacks encountered in the prior art.

Another object of the present invention resides in a servo-steering system for vehicles in which shocks and impacts introduced into the steering gear from the road surface are effectively damped and prevented from becoming effective at the steering hand wheel.

A further object of the present invention resides in a steering system for vehicles of the type described above in which the steering worm can adjust itself upon turning of the steering hand wheel only when a pressure has already been initiated by the steering nut.

A still further object of the present invention resides in a steering mechanism of the type described above which is simple in construction and assures a compact, space-saving realization.

Another object of the present invention resides in a steering system with conical support surfaces which can be manufactured and assembled in a simple manner.

These and further objects, features and advantages of the present invention will become more apparent from the following description when taken in connection with the accompanying drawing which shows, for purposes of illustration only, one embodiment in accordance with the present invention, and wherein:

The single FIGURE is an axial cross-sectional view through a servosteering mechanism according to the present invention.

Referring now to the single FIGURE of the drawing, the steering gear housing generally designated by reference numeral 10 is constructed as pressure medium cylinder, in which is displaceably guided a working piston 11 which subdivides the pressure medium cylinder 10 into the two working pressure spaces 12 and 13 and which is spirally movably connected with the steering worm generally designated by reference numeral 14 by means of a steering nut 15. The steering nut 15 is rotatably as well as axially non-displaceably supported in the working piston and includes a non-rotatable control arm 16 for the actuation of a control slide valve member generally designated by reference numeral 17 which controls the pressure in the working pressure spaces 12 and 13. Since the control slide valve 17 and its actuation by means of the control arm 16 are of conventional construction, a detailed description thereof is dispensed with herein. The working piston 11 is provided with a toothed rack profile 18 into which engages a toothed segment 19 of the steering shaft 21 supported in a housing bulge 20 of the steering gear housing 10. The steering shaft 20 is operatively connected with the steering linkage leading to the steerable wheels.

The steering worm 14 extends through the housing 10 by means of a bearing arrangement generally designated by reference numeral 22 and terminates in a coupling pin 23 which serves for the connection with the steering hand wheel.

The bearing arrangement 22 serves both for the radial as well as the axial bearing support of the steering worm 14 and, for this purpose, includes two inclined ball bearings generally designated by reference numerals 24 and 25, whose smaller bearing races 26 and 27 are displaceably centered on a respective shaft section 29 and 30 disposed to both sides of a radial bearing collar 28.

Whereas the larger bearing race 31 of the axially inner inclined ball bearing 24 is substantially rigidly seated in the housing end cover 32, the larger bearing race 33 of the other inclined ball bearing 25, which is radially movable by a slight play, is axially supported at an adjusting sleeve 34 screwed into the cover 32.

For the springy support of the steering worm 14 in both directions of its axis 35 relative to the housing 10, one cup spring 36 and 37 each are inserted between the bearing collar 28 and the smaller bearing races 26 and 27, respectively. The cup springs 36 and 37 are under prestress in the illustrated neutral position of the steering worm 14 with respect to the steering gear housing 10 and abut in this position with their adjacent end surfaces at a cone ring 38 having a conical cross section which, during the displacement of the steering worm 14, so supports the cup spring disposed opposite to the displacement direction that the same continues to remain under prestress. As indicated at 39 and 40, the steering worm 14 may be displaced by a certain play in both longitudinal directions with respect to the housing 10 so that after overcoming the spring prestress, road surface shocks and impacts introduced by the steering shaft 21 are absorbed by the cup springs 36 and 37.

Due to the spring prestress of the cup springs 36 and 37, it is achieved that during the turning of the steering hand wheel or the rotation of the steering worm 14 at first the control arm 16 is deflected before a displacement of the steering worm 14 with respect to the housing 10 can occur.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A steering mechanism for vehicles comprising a steering gear housing, a steering nut means, a steering worm means spirally movably connected with the steering nut means, and support means for axially supporting said steering worm means with respect to said steering gear housing; said support means including first and second prestressed resilient means engaged in respective opposite axial directions between said steering worm means and said steering gear housing for resiliently maintaining said steering worm means in a neutral central axial position with respect to said steering gear housing, and abutment means axially fixed with respect to said gear housing and in abutting engagement with said resilient means, said abutment means being configured and positioned to maintain one of said resilient means in prestressed condition during axial movement of said steering worm means against the other of said resilient means.

2. A steering mechanism according to claim 1, wherein said steering nut means is operatively connected to a control slide valve which actuates a fluid servo system to assist in turning operations.

3. A steering mechanism according to claim 2, wherein said steering worm means is axially fixed to a coupling pin which serves for connecting with a hand wheel.

4. A steering mechanism according to claim 1, wherein said abutment means is positioned between said first and second resilient means.

5. A steering mechanism according to claim 4, wherein said abutment means is constructed as a ring member with oppositely facing conical surfaces in abutting engagement with the respective first and second resilient means.

6. A steering mechanism according to claim 4, wherein said steering nut means is operatively connected to a control slide valve which actuates a fluid servo system to assist in turning operations.

7. A steering mechanism according to claim 6, wherein said steering worm means is axially fixed to a coupling pin which serves for connecting with a hand wheel.

8. A steering mechanism according to claim 1, wherein said first and second resilient means are constructed as respective first and second springs, each of said springs having one end engaging with a collar on said steering worm and the other end engaging with one of respective oppositely facing surface portions which are axially fixed with respect to said steering gear housing.

9. A steering mechanism according to claim 8, wherein said abutment means is positioned between said oppositely facing surface portions.

10. A steering mechanism according to claim 9, wherein said springs are cup springs which are clamped at the outer edges thereof between said abutment means and respective ones of said oppositely facing surface portions.

11. A steering mechanism according to claim 10, wherein said abutment means is constructed as a ring member with oppositely facing conical surfaces in abutting engagement with the respective cup springs.

12. A steering mechanism according to claim 10, wherein said oppositely facing surface portions are formed on respective inner bearing races of bearings rotatably supporting said steering worm means with respect to said steering gear housing.

13. A steering mechanism according to claim 12, wherein said abutment means is constructed as a ring member with oppositely facing conical surfaces in abutting engagement with the respective cup springs.

14. A steering mechanism according to claim 13, wherein said steering nut means is operatively connected to a control slide valve which actuates a fluid servo system to assist in turning operations.

15. A steering mechanism according to claim 14, wherein said steering worm means is axially fixed to a coupling pin which serves for connecting with a hand wheel.

16. A steering mechanism according to claim 8, wherein said oppositely facing surface portions are formed on respective inner bearing races of bearings rotatably supporting said steering worm means with respect to said steering gear housing.

17. A steering mechanism according to claim 8, wherein said steering nut means is operatively connected to a control slide valve which actuates a fluid servo system to assist in turning operations.

18. A servo-steering mechanism for vehicles comprising a steering gear housing, a steering nut means, control slide valve means operatively connected to said steering nut means for actuating a fluid servo system to assist turning operations, a steering worm means spirally movably connected with the steering nut means, said steering worm means being axially fixed to a coupling pin which serves for connecting to a hand wheel, and support means for axially supporting said steering worm means with respect to said steering gear housing; said support means including prestressed resilient means engaged in respective opposite axial directions between said steering worm means and said steering gear housing for resiliently maintaining said steering worm means in a neutral central axial position with respect to said steering gear housing, and abutment means axially fixed with respect to said gear housing and in abutting engagement with said resilient means for absorbing the prestress of said resilient means.

19. A steering mechanism according to claim 18, wherein said resilient means includes first and second resilient members engaged in said respective opposite axial directions between said steering worm means and said steering gear housing, and wherein said abutment means is configured and positioned to maintain one of said resilient members in prestressed condition during axial movement of said steering worm means against the other of said resilient members.

20. A steering mechanism according to claim 18, wherein said resilient means includes first and second resilient members engageable in said respective opposite axial directions between said steering worm means and said steering gear housing, and wherein said abutment means is positioned between said first and second resilient members.

21. A steering mechanism according to claim 20, wherein said abutment means is constructed as a ring member with oppositely facing conical surfaces in abutting engagement with the respective first and second resilient members.

22. A steering mechanism according to claim 18, wherein said resilient means includes first and second resilient members engageable in said respective opposite axial directions between said steering worm means and said steering gear housing, and wherein said first and second resilient members are constructed as respective first and second springs, each of said springs having one end engaging with a collar on said steering worm and the other end engaging with one of respective oppositely facing surface portions which are axially fixed with respect to said steering gear housing.

23. A steering mechanism according to claim 22, wherein said abutment means is positioned between said oppositely facing surface portions.

24. A steering mechanism according to claim 23, wherein said springs are cup springs which are clamped at the outer edges thereof between said abutment means and respective ones of said oppositely facing surface portions.

25. A steering mechanism according to claim 24, wherein said abutment means is constructed as a ring member with oppositely facing conical surfaces in abutting engagement with the respective cup springs.

26. A steering mechanism according to claim 25, wherein said oppositely facing surface portions are formed on respective inner bearing races of bearings rotatably supporting said steering worm means with respect to said steering gear housing.

27. A steering mechanism according to claim 18, wherein said oppositely facing surface portions are formed on respective inner bearing races of bearings rotatably supporting said steering worm means with respect to said steering gear housing.

* * * * *